United States Patent [19]

Boeckmann

[11] Patent Number: 4,517,414
[45] Date of Patent: May 14, 1985

[54] HOOKSWITCH BOUNCE RESISTANT TELEPHONE HOLD-MUTE CIRCUIT

[75] Inventor: Eduard F. B. Boeckmann, Huntsville, Ala.

[73] Assignee: GTE Communication Systems Corp., Northlake, Ill.

[21] Appl. No.: 560,623

[22] Filed: Dec. 12, 1983

[51] Int. Cl.³ .............................................. H04M 1/00
[52] U.S. Cl. ............................... 179/81 R; 179/99 H
[58] Field of Search ................ 179/81 R, 99 H, 84 R, 179/84 A

[56] References Cited

U.S. PATENT DOCUMENTS 4,447,674  5/1984  Grantland et al. ................ 179/81 R
4,451,706  5/1984  Boeckman ........................ 179/81 R Primary Examiner—Gene Z. Rubinson
Assistant Examiner—James L. Dwyer
Attorney, Agent, or Firm—Robert J. Black; Gregory G. Hendricks

[57] ABSTRACT

A hold circuit for use with a single line telephone operable over long or short telephone loops. The included circuit during response to the momentary operation of a manual switch actuates a silicon controlled rectifier to place a resistive load across the telephone line thus allowing the subscriber at the telephone instrument to go "on-hook". Subsequent removal of the basic instrument handset from the hook-switch, or of a related extension telephone going "off-hook", will cause the resistive load to be removed.

13 Claims, 1 Drawing Figure

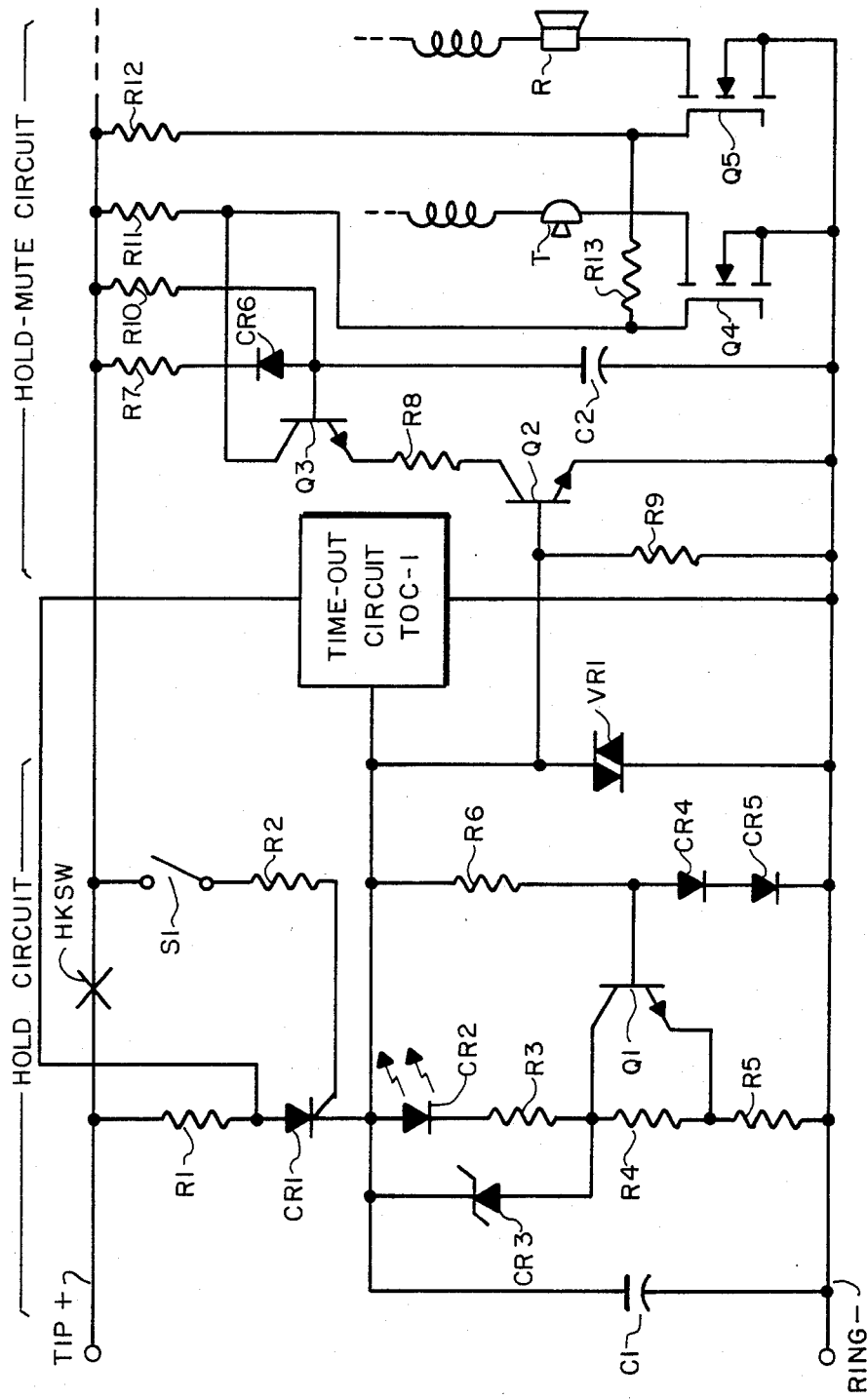

HOOKSWITCH BOUNCE RESISTANT TELEPHONE HOLD-MUTE CIRCUIT

BACKGROUND OF THE INVENTION

1. Technical Field

The present invention relates to hold circuits for use in subscribers electronic telephones, and more particularly, to electronic telephone hold circuits which require extremely reliable operation under long loop conditions.

2. Background Art

Since the development of circuitry employing active components, i.e., solid state devices, etc., many additional features have been very easily added to conventional telephone circuitry. One such feature has been the addition of the so-called "hold" circuitry. With the provision of such a circuit, a telephone call may be electronically latched onto an artificial load allowing the handset to be returned to the hookswitch, until the call is picked up on an associated extension telephone or again picked up at the original phone, at which time the hold condition is dropped automatically.

Many previous hold circuits frequently made use of expensive components such as latching relays and/or integrated circuit voltage comparators and related circuitry adding substantial cost to the telephone. Sometimes such hold circuits had poor sensitivity because of the compromise between trigger "on" sensitivity and the ability to drop completely on high resistance extensions and/or in the presence of low central office battery voltage. Some hold circuit methods required the use of a microprocessor and related circuitry to sense the line voltage change with conversion of the result to a digital signal. It is obvious that all such circuitry suffers to some extent from a great degree of over complexity and attendant thereon a reduction in the reliability, stemming from the increased number of components required in such circuit design.

One particular problem of reliability existing in the previous hold circuitry design is the possibility of dropping the call inadvertently by a slight bounce of the hookswitch contacts when going on-hook after a hold condition has been initiated. This premature hold drop was more likely to occur on long loops with low central office battery voltages or with low DC resistance telephones. An associated problem has also been the low level of brightness of on associated light emitting diode or indicator lamp used to indicate the hold condition, particularly under long loop conditions with the handset off-hook. Such low level conditions traditionally force the indicator lamp to be mounted on the top surface of the telephone so that it might be more readily seen. This method which is quite expensive instead of being able to mount the lamp or light emitting diode on the included printed circuit cord and then utilizing fiber optics or "light pipes" to conduct light to the top surface of the telephone for viewing.

Accordingly, it is the object of the present invention to provide a new and useful telephone hold circuit that provides a greater degree of reliability of operation, fewer components and higher brightness of indicator illumination on long telephone loop conditions.

SUMMARY OF THE INVENTION

The hold circuit portion of the present invention employs very simple circuitry consisting of a manually operated momentary switch, a silicon controlled rectifier, a number of resistors, a capacitor, a light emitting diode, a number of conventional diodes, a transistor and a varistor. In the arrangement disclosed, the silicon controlled rectifier acts as the principal switching device to place a hold circuit, consisting of a number of resistances and a light emitting diode, across the telephone line in response to the momentary operation of the included manual switch. The silicon controlled rectifier also provides current to the light emitting diode to indicate that the hold circuit is in operation. The included capacitor provides a voltage reference for the hold circuit and also provides the necessary back electromotive force to turn off the silicon controlled rectifier in response to the drop in telephone line voltage that occurs when an associated telephone extension goes off-hook, or the hookswitch of the associated telephone is operated. By proper choice of the resistors and capacitor included in the hold circuitry, operation can be guaranteed over a wide range of telephone line conditions.

The transistor included in the hold circuit provides a variable DC load for the telephone line (during the hold condition), depending on loop condition. On short telephone loops, the transistor is "off" and full circuit resistance is in the load. On long telephone loops, the transistor turns on shunting one of the resistors in the hold circuit allowing more current to flow for greater brightness at the indicator without adversely affecting circuit drop sensitivity on short and long telephone loops. A low-value high-wattage resistor and a varistor protect the circuit from lightning surge damage.

The muting portion of the circuitry, which functions when the circuit is in the hold condition and the telephone is off-hook, is an important feature in increasing the reliability of operation of the hold circuit, especially on long loops. The mute circuit is arranged to reduce substantially the loading effect of the telephone itself when the hold circuit is first triggered, so that more current is available for the hold silicon controlled rectifier switch to stay switched on and for the hold indicator to be brightly lit.

However, the mute condition must release when the telephone is placed on-hook, so that removing the handset again from the off-hook condition, the load of the telephone will automatically drop the hold condition. However, in addition, the mute condition must not release too quickly when going on-hook, or the hold will drop prematurely due to switch bounce. Conversely, if the time constant of the circuit as incorporated is properly adjusted, the hold circuit will not drop with reclosing of the hookswitch (or "bounce" of the contacts), but will drop only with a deliberate on-hook to off-hook cycle, with the on-hook timed at least one or two seconds before again going off-hook. Going off-hook on an extension phone will drop the hold condition automatically at any time. The hookswitch also must be resistant to false triggering by dial pulses or hookswitch flashing. The present invention is also compatible with an automatic time-out function as disclosed in my co-pending applications, Ser. Nos. 526,231 and 526,250, filed on Aug. 25, 1983. Part of the present circuitry can be used without a time-out function for those applications where no time-out is desired.

BRIEF DESCRIPTION OF THE DRAWING

The single sheet of the accompanying drawing is a combination simplified schematic and block diagram of a subscriber's telephone hold circuit.

DESCRIPTION OF THE PREFERRED EMBODIMENT

Referring now to the accompanying drawing, the hold circuit portion of the present invention consists of a silicon controlled rectifier CR1, light emitting diode CR2, manually operated momentary switch S1, resistors R1 through R6, capacitor C1, diodes CR3, CR4 and CR5, transistor Q1, and varistor VR1.

As shown in the drawing, the hold circuitry is connected across the tip and ring leads (T and R) of a telephone line which extends either to a telephone central office or private branch exchange. In a practical embodiment of the present invention, surge protection circuitry would also be included across the telephone line; however, it has not been shown for purposes of simplicity, inasmuch as it does not pertain to the present invention.

It should be noted, however, that resistor R1 and varistor VR1 provide adequate lightning surge protection for the hold circuit itself. During a lightning surge, silicon controlled rectifier CR1 will turn on allowing varistor VR1 to clamp the rest of the circuit at a low voltage thereby forcing resistor R1 to absorb the bulk of the energy thereby protecting the hold circuit. This surge protection should be considered as part of the invention in that it permits low voltage inexpensive components to be utilized throughout the circuitry. Note that the time-out circuit TOC-1 and the hold-mute circuitry is also protected by resistor R1 and varistor VR1.

Not shown, but also connected across the telephone line, may be one or more extension telephones. The circuitry of the basic telephone has not been shown other than the transmitter T and receiver R and leads extending through inductances therefrom to the basic telephone circuitry, which has not been shown, inasmuch as it does not form a portion of the present invention, or is it needed for understanding of the present invention. The hookswitch HKSW is placed between the silicon controlled rectifier CR1 and momentary operative switch S1 is also considered part of the basic telephone circuit. It should be noted that the location of the hookswitch is not important unless it is desired not to be able to initiate hold with the instrument in the on-hook condition. Silicon controlled rectifier CR1 is turned on when its gate is connected to the positive (tip) lead through manual operation of switch S1. This action places the holding bridge circuit consisting of silicon controlled rectifier CR1, light emitting diode CR2 and resistors R1, R3 R4 and R5 across the telephone line. It should be noted that it is important that the polarity of the tip and ring lines be as shown in the accompanied drawing. This is usually guaranteed by means of the inclusion of a diode bridge in the circuitry. However, such bridge circuit has not been shown in the present circuitry purely for purposes of simplicity.

Resistors R3, R4 and R5 limit current through light emitting diode CR2 and the proper value permits sufficient hold current under both short and long telephone loop conditions. This value is maintained to several hundred ohms on short loops so that the circuit will drop properly when a related extension telephone goes off-hook. This drop action is aided significantly by capacitor C1 which charges quickly to the line voltage less the voltage drop across the silicon controlled rectifier CR1 when the hold feature is activated by operation of switch S1. When an extension is picked up or hookswitch HKSW is closed, from its open condition, capacitor C1 will be at a higher voltage than the tip conductor of the line relative to the ring conductor of the line, and therefore silicon controlled rectifier CR1 will be turned off due to a negative potential existing from its anode to cathode causing the hold to be dropped.

On long loops transistor Q1 turns on when current through resistor R5 has dropped low enough to provide sufficient base-to-emitter voltage from the clamping of transistor Q1 base by diodes CR4 and CR5. Resistor R4 is then shunted lowering the resistance of the hold circuit and stabilizing current at a higher level than it would otherwise be the case without the operation of transistor Q1. The inclusion of transistor Q1 and associated circuitry allows more reliable holding of the silicon controlled rectifier CR1 on long loops and brighter illumination of the light emitting diode CR2. Diode CR3 regulates current through the light emitting diode CR2 on short loops. Resistor R6 provides positive bias and base current for transistor Q1. After a drop, closing of the momentary switch S1 would turn the silicon controlled rectifier CR1 back on for the next hold condition.

Light emitting diode CR2 is a low voltage high current unit with visible output over a wide range of telephone loop conditions. It has been found that in a practical embodiment of the present invention the circuitry was shown to function with zero loop conditions at a high battery voltage and with low battery voltage with more than 23.5 thousand feet of simulated telephone wire.

Referring now again to the drawing, the hold-mute portion of the circuitry is shown and consists of transistors Q2 through Q5, resistors R7 through R13, capacitor C2 and diode CR6. In the hold-mute portion of the circuit, when first going off-hook, capacitor C2 charges through resistor R10 in approximately maximum time of five seconds on a long loop, or in a faster period of time if the telephone is connected over a shorter loop. Transistor Q3 is then biased to turn on in the event that transistor Q2 turns on by a positive bias signal from the hold circuit. When a hold is initiated, Q2 will turn on and then Q3 will turn on and the voice network is either muted as shown in the drawing for dual tone multifrequency type telephones or totally disconnected in dial pulse key operated type telephones with similar circuitry. The mute condition removes the telephone load from the phone line to a partial (in the case of dual tone multifrequency phones) or virtually complete extent (in the case of dial pulse telephones) so that the hold circuit receives most of the available loop current and holds reliably even if the hookswitch HKSW is "bounced" or momentarily closed for a fraction of a second. Circuit muting can be arranged so that microphone muting is 100% and the receive muting is only partial as shown in the present drawing determined by resistors R12 and R13.

When the telephone handset is placed on hook-switch HKSW returning the telephone to the "on-hook" condition for at least a second or two, capacitor C2 discharges sufficiently so that transistor Q3 turns off and the voice network is now ready to connect immediately when a transition to the off-hook condition again occurs. This means that the master telephone will drop its hold condition when coming back to the off-hook condition. Capacitor C2 discharges quickly in the on-hook condition through diode CR6, resistor R7 and through transistors Q2 and Q3 as long as the charge on capacitor C2 is sufficient to keep Q3 on enough to leak a charge. (It should be noted that transistor Q2 remains on during the hold condition.) When coming back to the off-hook condition, capacitor C2 again charges up ready for the next hold cycle, but silicon controlled rectifier CR1 has already dropped the hold condition so that transistor Q2 is turned off and the voice network is not muted. It should also be noted that the same elements such as Q3 and Q4 that are used for the hold-mute circuitry can also be used as dial pulse or dual tone multifrequency tone muting devices, so that the requirement for extra switching devices is not present.

It will be obvious to those skilled in the art that numerous modifications may be made without departing from the spirit of the present invention which shall be limited only by the scope of the claims appended hereto.

What is claimed is:

1. A subscriber's telephone circuit connected to a pair of telephone line conductors and including a transmitter, a receiver, a hookswitch and a hold circuit comprising: a manually operated switch; a holding bridge including a plurality of resistances connected in series, connectable between said line conductors; gating means included in said holding bridge and including a circuit connection to said switch operated in response to the manual operation of said switch to complete a circuit path through said holding bridge between said line conductors; and there is further included shunt means connected in parallel with at least one of said resistances operated in response to a flow of less than a predetermined amount of current through said holding bridge, to provide a low impedance path around said parallel connected resistor.

2. A subscriber's telephone circuit as claimed in claim 1 wherein: said holding bridge further includes indicator means operated in response at completion of said circuit path through said holding bridge between said line conductors.

3. A subscriber's telephone circuit is claimed in claim 2 wherein: said indicator means comprise a light emitting diode.

4. A subscriber's telephone circuit as claimed in claim 1 wherein: said shunt means include a transistor having its base-emitter path connected in parallel with said resistor.

5. A subscriber's telephone circuit as claimed in claim 1 wherein: there is further included lightning surge protection means operated in response to the presence of voltage above a predetermined value to provide an alternate path around said hold circuit between said line conductors.

6. A subscriber's telephone circuit as claimed in claim 5 wherein: said lightning surge protection means comprise a resistor included in said holding bridge and a varistor shunting a portion of said holding bridge.

7. A subscriber's telephone circuit as claimed in claim 1 wherein: there is further included a capacitor operated in the establishment of said circuit path through said holding bridge between said line conductors to charge to a predetermined value and further operated in response to operation of said hook-switch to the off-hook position alternatively operated in response to the connection of another telephone circuit to said line conductors to provide a back electromotive force, to render said gating means inoperative and thereby render said path through said holding bridge between said line conductors incomplete.

8. A subscriber's telephone circuit as claimed in claim 1 wherein: there is further included first switching means connecting said transmitter to one of said line conductors;

second switching means normally connecting said receiver to one of said line conductors; third switching means initially conditioning said first and second switching means for operation; and fourth switching means operated in response to the completion of said holding bridge circuit between said line conductors to operate said conditioned first and second switching means to mute said transmitter and said receiver.

9. A subscriber's telephone circuit as claimed in claim 8 wherein: there is further included delay means operated a predetermined time after said subscriber's hookswitch is operated to the off-hook position to render said conditioning means operated.

10. A subscriber's telephone circuit as claimed in claim 9 wherein: said delay means comprise a capacitor.

11. A subscriber's telephone circuit as claimed in claim 8 wherein: said first and second switching means each comprise a transistor.

12. A subscriber's telephone circuit as claimed in claim 8 wherein: said third switching means comprises a transistor.

13. A subscriber's telephone circuit as claimed in claim 8 wherein: said fourth switching means comprises a transistor.

* * * * *